UNITED STATES PATENT OFFICE.

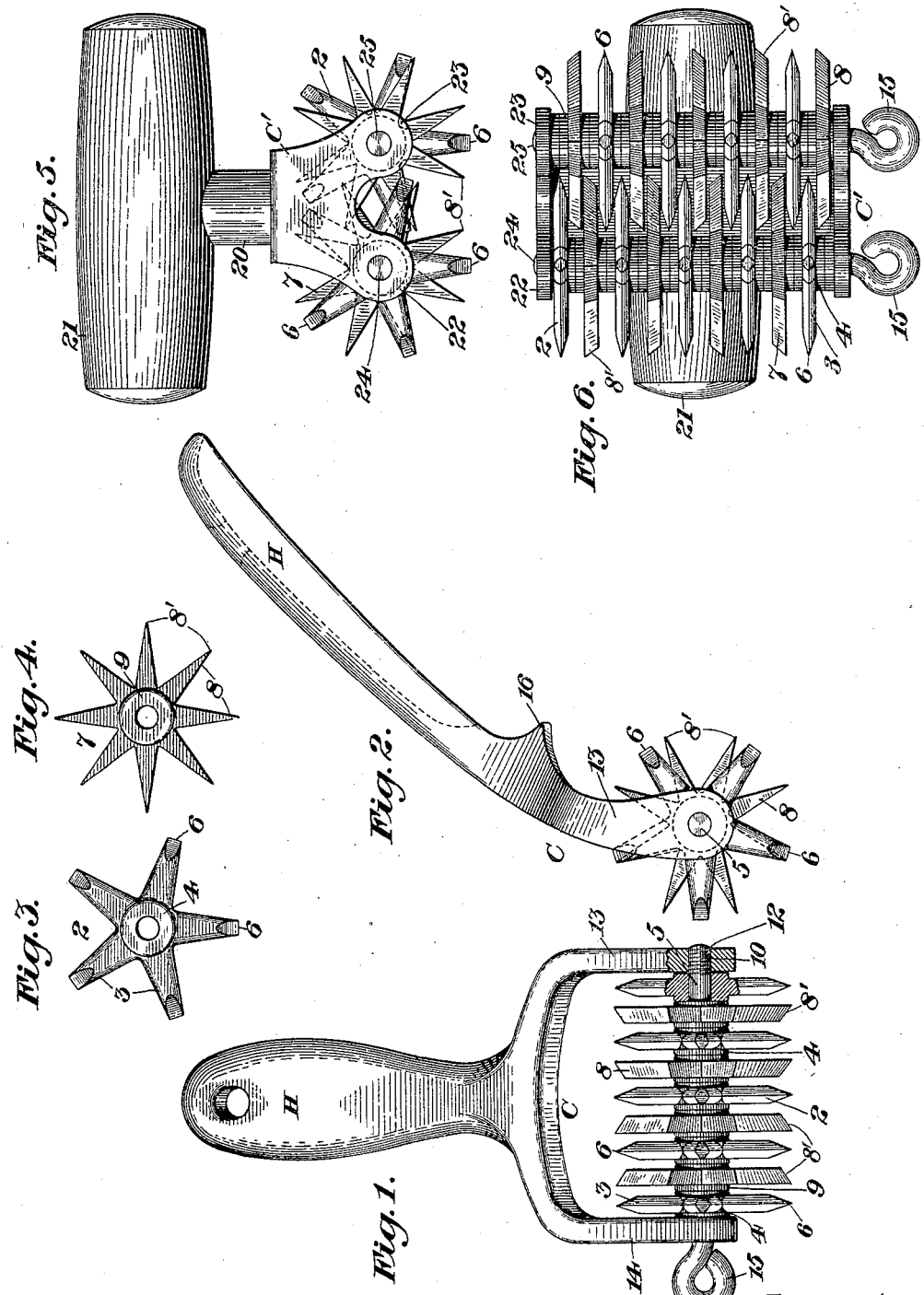

FRANCIS E. MAISONVILLE, OF NEW BRITAIN, CONNECTICUT, ASSIGNOR OF ONE-HALF TO JUSTUS A. TRAUT, OF SAME PLACE.

MEAT-TENDERER.

SPECIFICATION forming part of Letters Patent No. 589,477, dated September 7, 1897.

Application filed March 18, 1897. Serial No. 628,113. (No model.)

*To all whom it may concern:*

Be it known that I, FRANCIS E. MAISONVILLE, a citizen of the United States, residing in New Britain, in the county of Hartford and State of Connecticut, have invented certain new and useful Improvements in Meat-Tenderers, of which the following is a specification.

This invention relates to meat-tenderers of the "rotary" type, the main object being to provide a simple and efficient device of this character comprehending a carrier and a plurality of cutter-wheels the cutting edges of the teeth of which are disposed transversely relatively to each other. In the form illustrated the cutting edges of the teeth of one cutter-wheel are disposed transversely to those of the next adjacent cutter-wheel, and so on throughout the series, so that as said cutting-wheels are rolled along the meat they operate without any tendency to flatten or mash the same and form a series of cuts or indentations substantially at right angles to each other. To accomplish this purpose I preferably dispose the cutters in sets, those of one set being composed of cutters having an odd number of teeth—for instance, five, as illustrated—and those of the other set having an even number of teeth, shown for purposes of illustration as eight in number. The teeth of the cutters of odd number are shown beveled convergingly to a point from each side in the direction of the length of the tooth, while those of the cutters having an even number of teeth are illustrated provided with sharpened edges having converging sides and cutting faces inclined on a diagonal line from the point downward, so that they act upon the meat with what may be termed a "shearing" cut or indentation.

I have shown for purposes of illustration five teeth in each wheel of the set of cutters having an odd number of teeth and eight teeth in the set having an even number of teeth, the construction being such that a cutter of even number of teeth alternates with one having an odd number, and vice versa. By virtue of this arrangement it will be seen that the active faces or cutting-points of the cutters have what may be termed a "staggered" relation to each other, in virtue of which when the tenderer is in action upon the meat no two cutting-points will come into the same alinement, and the meat will be indented or cut with a series of slits or indentations substantially at right angles to each other and varying, in crisscross relation, throughout its surface.

While for purposes of illustration I have shown one set of cutters provided with wheels having five teeth and another set with wheels having eight teeth, it is distinctly to be understood that this arrangement is arbitrary and may be changed as fancy or circumstances may require, my invention including any rotary cutter as a whole composed of alternate wheels having even and odd numbered teeth, the cutting edges of the teeth of one wheel being disposed substantially at right angles to those of the other wheel.

In the drawings accompanying and forming part of this specification, Figure 1 is a plan view of one form of my improved meat-tenderer. Fig. 2 is an end elevation of the same as seen from the right in Fig. 1. Figs. 3 and 4 are detail views in elevation of two cutters of the series. Fig. 5 is an end elevation of another form of my improved meat-tenderer, two series of cutters being shown, the cutters of one series entering the spaces between the cutters of the other series; and Fig. 6 is a bottom view of the same.

Similar characters designate like parts in all the figures of the drawings.

My improved meat-tenderer embodies a carrier which may be of any suitable construction, but which is herein represented as a handle H, having a yoke or bifurcation C, which constitutes an extension of and is preferably cast or formed integral with said handle H.

The invention involves a plurality of cutters the cutting edges of the teeth of which are disposed transversely relatively to each other, and said cutters may be of any convenient construction, they being illustrated consisting of toothed wheels preferably removably connected to the carrier C, whereby they may be readily disassembled to clean or sharpen the same.

The first cutter-wheel of the series is designated by 2, (see Fig. 3,) and it has a multiplicity of teeth 3, radiating from the hub 4, which latter is rotatively mounted on the axle or shaft 5. The teeth 3 of the cutter 2 are preferably beveled or sharpened at their outer ends in a line in the direction of the length of the tooth to form cutting edges 6, which indent or slit the meat in the direction in which the device is being forced over it.

The adjoining cutter-wheel of the series is designated by 7, it, like the cutter 2, having a plurality of teeth 8, which are made comparatively wide and which radiate from the hub 9, the latter being mounted on the axle 5 for rotation and contiguous to the hub 4. The teeth 8 are beveled or sharpened at their outer ends to form cutting edges 8', and the cutting edges of the teeth 8 are disposed transversely to the cutting edges of the teeth 3, as will be seen by Figs. 1 and 2.

The cutter-wheels 2 and 7 are mounted on the axle or shaft 5 for rotation and are preferably arranged in alternation thereon, whereby as said wheels are rolled along the meat they cover a comparatively wide surface and do not tend to mash the same.

The axle or shaft 5 is removably secured to the frame or yoke C, one end of said axle being threaded, as at 10, and being in engagement with internal threads 12 in the branch 13 of the said yoke, said axle or shaft being passed through a suitable opening in the opposite branch 14 of the yoke and having the thumb-piece or loop 15 on its end by which it can be turned to cause its threaded end 10 to engage or be disengaged from the threads 12. By disengaging the threads 10 from the threads 12 the shaft or axle may be readily withdrawn, and the series of cutters thereon can be quickly removed for sharpening or cleansing purposes.

On reference to Fig. 1 of the drawings it will be observed that the cutting edges 8' of the teeth of the cutter-wheel 7 are disposed at an inclination, so that as said cutter-wheel travels along the meat each tooth thereof will gradually indent the same with a shearing action.

To cause the cutting edges of the respective cutters to alternate in action upon the meat, I provide, as above stated, one set of cutters (composed of the wheels 2) with an odd number of teeth and the other set of cutters (composed of the wheels 7) with an even number of teeth. By this arrangement it will be seen that the meat is indented or cut at points differing from each other and which are not in alinement, the object being to treat thoroughly the entire surface of the meat being operated upon and to indent or cut the same at different points throughout its surface. As before stated, the arrangement of cutters shown is merely arbitrary, as I deem any set of cutters having odd and even numbers of teeth for the purpose stated to be within the purview of my invention.

A handle H is illustrated having on its under surface, near the series of cutters, the projection or lug 16, against which the finger of the user can bear to apply a greater amount of pressure to the cutters, said projection also constituting a guard for preventing the hand from slipping forward against the cutting edges of the several cutters, this handle being preferably of a curved or concave form and so disposed that it can be swung vertically to bring the application of power or pressure directly in line with the axle 5.

In Figs. 5 and 6 I have represented a different form of my device, wherein two series of cutters are provided, the respective cutters of one of said series passing into the spaces between the cutters of the other series, whereby as the device is run backward and forward over the meat one set will clean the other, and vice versa, this organization also preventing particles of the meat from adhering to or caking on the several cutters. As regards this feature of the invention, however, the cutters may or may not be composed of sets having odd and even numbers of teeth, as above described. In said figures the carrier is represented at C', it having the projection 20, to which is attached the handle 21.

The carrier C' is provided at each end thereof with the depending arms 22 and 23, respectively, having openings similar to the branches 13 and 14 for receiving the shafts or axles 24 and 25 of the two series or sets of cutters, the latter being shown as similar in construction and arrangement to the series shown in Fig. 1.

Having described my invention, I claim—

1. A meat-tenderer comprising a frame and a series of independently-rotatable rotary cutters carried thereby and disposed in sets having different numbers of teeth, the cutting edges of one set being located in a transverse plane relatively to the cutting edges of the other set.

2. A meat-tenderer comprising a frame and two series of independently-rotatable cutters movable about two different axes, the cutting edges of one of said series of cutters extending into the spaces between the other series, and the cutters of each of the series being disposed in sets, the cutting edges of one set being located in a transverse plane relatively to the cutting edges of the other set.

3. A meat-tenderer comprising a frame and a series of rotary cutters carried by said frame, the cutting edges of the alternate cutters being in transverse planes relatively to each other, and the cutting edges of the individual cutters being disposed in one and the same direction.

FRANCIS E. MAISONVILLE.

Witnesses:
E. N. STANLEY,
G. P. FITCH.